Figure 1:
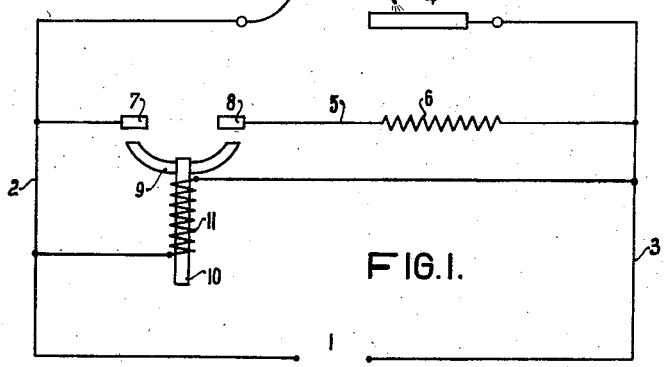

July 12, 1927.

J. H. EZENDAM

ELECTRIC ARC WELDING APPARATUS

Filed Jan. 2, 1926   2 Sheets-Sheet 1

1,635,208

J. H. Ezendam
INVENTOR

By: Marks & Clerk
ATTYS

July 12, 1927. 1,635,208
J. H. EZENDAM
ELECTRIC ARC WELDING APPARATUS
Filed Jan. 2. 1926 2 Sheets-Sheet 2

J. H. Ezendam
INVENTOR

By: Marks & Clerk
ATTYS

Patented July 12, 1927.

1,635,208

UNITED STATES PATENT OFFICE.

JAN HENDRIK EZENDAM, OF AMSTERDAM, NETHERLANDS, ASSIGNOR TO N. V. INDUSTRIE-EN HANDELMAATSCHAPPIJ V. H. HARMS & CO., OF AMSTERDAM, NETHERLANDS.

ELECTRIC-ARC WELDING APPARATUS.

Application filed January 2, 1926, Serial No. 78,941, and in the Netherlands December 20, 1924.

The British specification of Patent No. 12,724 A. D. 1910 relates to electric arc-welding apparatus, in which there is provided a shunt containing an auxiliary resistance across the branches of the welding circuit, said shunt being put in and out of circuit alternately with the welding arc. In this known apparatus, the shunt is opened and closed under the influence of an electromagnet, the coil of which is traversed by the welding current. If said electromagnet is energized when welding is being performed, it opens the shunt, but when the arc breaks, the coil of the electromagnet is deenergized, the core falls by gravity and the auxiliary resistance is again included in the circuit.

The present invention also contemplates the automatic putting in and out of the auxiliary resistance, but according to the invention this object is attained by novel means, which have specific advantages over the known art.

In accordance with the invention, the closure of the circuit comprising the shunt with the auxiliary resistance is not controlled by the comparatively rough means constituted by the interruption of the welding current, but under the influence of the tension, which varies during the progress of the work. The coil of the electromagnet, which controls the switch of the shunt is not, therefore, placed in the welding circuit, but it is connected at both ends to the voltages at either side of the welding arc, whereby different advantages are realized. In the first place, the closure of the shunt comprising the auxiliary resistance takes places when the electromagnet is energized, that is to say, in a more reliable manner than in the known apparatus, in which said shunt is closed by the weight of the core of the electromagnet when the latter is dead. A second advantage is, that the coil of the electromagnet is not traversed by the strong welding currents, but that it is supplied with current, the strength of which can be controlled at will. The most important advantage, however, results from an embodiment of the invention such, that the voltage or pressure magnet already becomes operative before the welding arc is broken, i. e. before the voltage has suddenly risen to a high value. Said embodiment is based upon the fact, that when welding is being performed, the voltage is to a certain extent proportionate to the variable length of arc—except of course with machines arranged to maintain a substantially constant tension. The voltage coil can be made in such a manner as to complete the shunt circuit comprising the auxiliary resistance at the moment, wherein the length of the welding arc, and, consequently, the voltage exceeds a predetermined limit. With these means it is impossible to perform welding with an excessively long arc (which, as is known in the art, does not give satisfactory results) as the inclusion of the auxiliary resistance in the welding circuit momentarily results in the interruption of the arc.

Figs. 1–5 of the drawing illustrate diagrammatically some embodiments of the invention.

The source of current (not shown) is connected as at 1 to the conductors 2 and 3, through which the current flows to the welding place 4. The conductor 5, which comprises the auxiliary resistance 6 and the contacts 7 and 8, is in shunt to the arc, said contacts being adapted to be bridged by a bridging member 9. Said member is secured to the core 10 of an electromagnet, the coil 11 of which is connected to the conductors 2 and 3.

Fig. 1 shows the apparatus in the position when the welding proceeds. The voltage across the conductors 2 and 3 is so low, that the attraction exercised by the coil 11 is insufficient to raise the core 10 and the member 9 to complete the shunt 5. If, however, said voltage rises to a predetermined value either before or after the interruption of the arc, the influence of the coil 11 on the core 10 is sufficient to strike the member 9 against the contacts 7, 8 so as to switch in the auxiliary resistance 6, whereby the arc breaks, if it had not been interrupted before. When the arc is again initiated by short-circuiting the place of weld 4, there is such a drop of potential, that the coil 11 can no longer support the core 10 with the member 9 and the shunt 5 is reopened.

Figure 2:
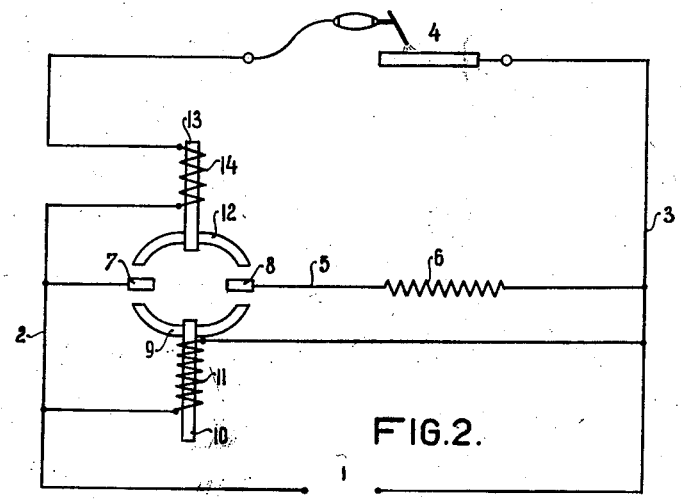

The novel automatic switch can also be combined with the prior means in the manner as illustrated in Fig. 2.

The parts 1 to 11 correspond to those in

Fig. 1. The contacts 7, 8, however, are adapted to be bridged, besides by the member 9, by a bridging member 12 secured to a core 13, the coil of which is placed in the welding circuit so as to be supplied with the welding current. When the welding apparatus is connected to the source of current, both members 9 and 12 bridge the contacts 7 and 8 as long as welding is not being performed and the auxiliary resistance 6 is then put in circuit. At the moment wherein the welding place is short circuited, coil 14 is energized and the energization of coil 11 is cut down. The member 12 is suddenly raised and the member 9 falls by gravity. The connection between the contacts 7 and 8 is thereby broken and the auxiliary resistance is cut out.

In this embodiment, the strength of coil 11 should be so chosen relative to the weights of the member 9 and of the core 10, that the latter will be raised to bridge the contacts 7 and 8 through the member 11 if, during the welding operation, the length of the arc exceeds a certain limit and the voltage thereby rises to a predetermined value. At such moment the arc is extinguished by the inclusion of the auxiliary resistance 6, whereby coil 14 is deenergized, core 13 falls by gravity and member 12 bridges the contacts 7 and 8. As compared with the embodiment shown in Fig. 1, this arrangement offers the advantage of greater reliability as far as the inclusion of the auxiliary resistance is concerned, for if coil 11, due to any cause, should fail to operate as desired, coil 14 will switch in the auxiliary resistance immediately after the arc is broken.

Figure 3:
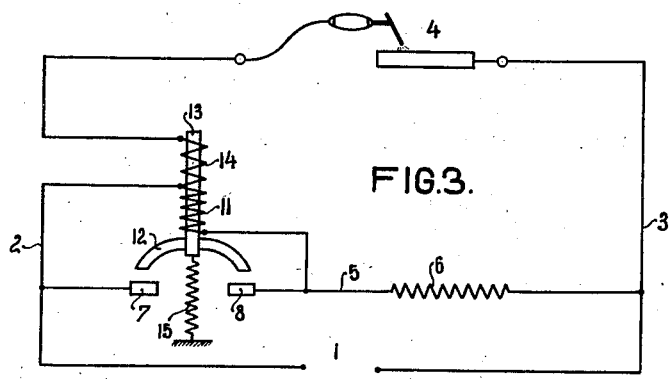

In this respect the embodiment illustrated in Fig. 3 is still preferable. In this embodiment, both coils 11 and 14 envelope a common core 13. When energized, coil 14 tends to raise the core 13, but it is counteracted by coil 11, by the weights of core 13 and bridge 12, and by the tension of the spring 15. The strengths of both coils are so proportionated, that when the welding is started, i. e. when the arc is being drawn, the short circuit current traversing coil 14 pulls the core 13 and the member 12 upwards. During the progress of the work, when the strength of the current is reduced and the tension has increased, a certain equilibrium is established between the forces acting upon the core 13, which, consequently, remains floating. If the length of the arc exceeds a predetermined limit, the voltage coil 11 prevails, so that it pulls the core 13 down and as soon as the member 12 bridges the contacts 7 and 8, the resistance 6 is put in circuit and the arc is extinguished. At the same moment both coils are deenergized, coil 11 because it is short circuited by the member 12, coil 15 because of the opening of the welding circuit in which it is placed.

The spring 15 can be provided with tension adjusting means, whereby the voltage at which the arc is broken can be regulated.

Figure 4:
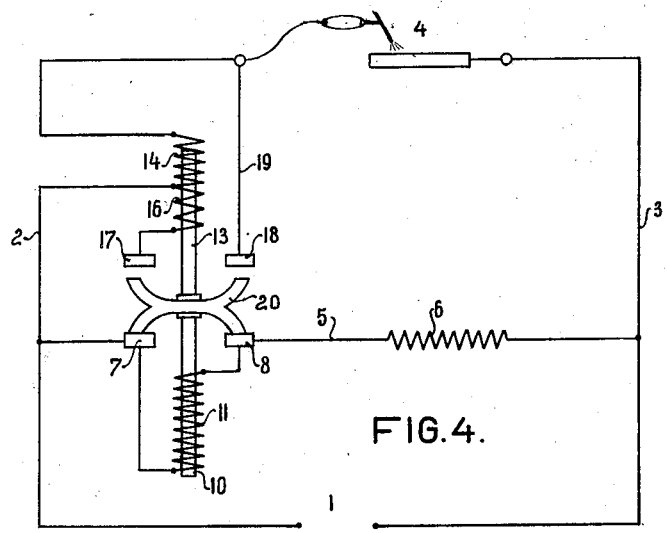

The arrangement shown in Fig. 4 also comprises two coils in opposition to each other. Coil 11 again forms a voltage coil and envelopes the core 10, whereas coil 14, placed in the welding circuit, envelopes the core 13. The coil 14 having a high ohmic resistance also forms a voltage coil. Also enveloping core 13 and placed in the welding circuit is a second coil 16. Coils 14 and 16 are connected in parallel to the conductor 2 so that, when the coil 16 is cut in, the coil 14 is practically short circuited. The coil 16 is only supplied with current from contacts 17, 18 and lead 19 when said contacts are bridged by the member 20.

The modus operandi of this automatic switch is as follows:

The figure shows the apparatus in the position, wherein the same is connected to a transformer but wherein no welding is being performed. If now contact is made at the welding place 4, coil 14 is energized. At this moment, said coil is not yet opposed by coil 11, because the latter is short-circuited, so that the bridging member 20 is pulled upwards. Concurrently, the connection between the contacts 7 and 8 is broken, whereby the resistance 6 is almost completely cut out, but said resistance is still traversed by the current, which now energizes coil 11. This coil now counteracts coil 14, whereby the movement of the bridging member is braked and the impact resulting from the said member striking against the contacts 17, 18 is damped. At the moment, wherein these contacts are interconnected, the coil 16 is switched in and the welding current is closed. The bridging member 20 is now held in engagement with the contacts by the action of the coil 16, whereas coil 11 is short-circuited so that there is no current in it. In this position of the different parts welding can proceed.

If, owing to an excessive length of arc, the voltage rises to a predetermined limit, the coil 11 prevails so that it pulls the member 20 downward and the connection between the contacts 17 and 18 in the welding circuit is broken. As a consequence, the arc is momentarily interrupted, both coils 14 and 16 are deenergized and coil 11, the strength of which still increases for a short time owing to the rise of voltage, retracts the bridge 20, whereby the latter engages contacts 7 and 8. As a result, the coil 11 is short-circuited and the auxiliary resistance 6 is cut in.

This embodiment has the advantage, that the coil 11 does not "hesitate", for it deenergizes the opposing coil 16 as soon as its core begins to fall, but it has the inconvenience, that for a very short time practically full zero load voltage occurs, which voltage, as a rule, is dangerously high. This, however, is only a disadvantage as compared with other embodiments of the invention, for instance, the one illustrated in Fig. 3, but not in comparison with known apparatus comprising an automatic switch, which puts the auxiliary resistance in circuit owing to the interruption of the arc.

Figure 5:
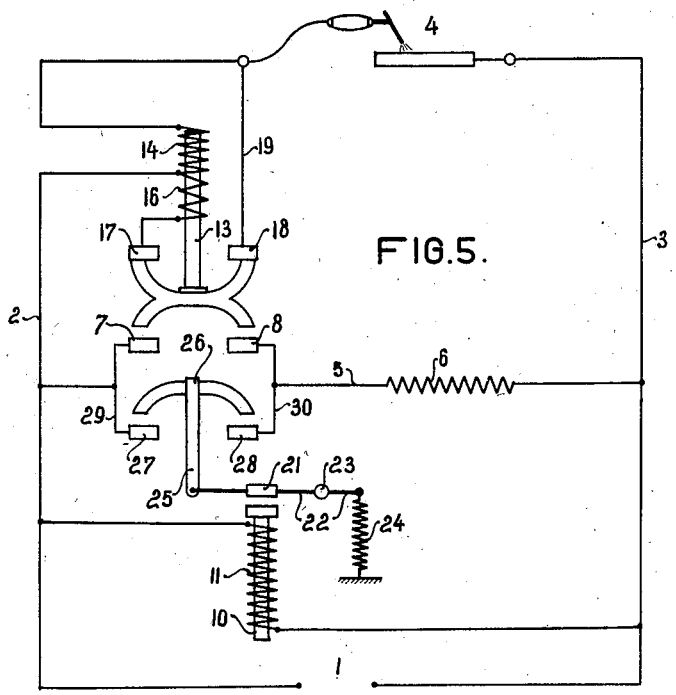

Fig. 5 still shows the diagram of a welding apparatus, which also has the advantage that the coil 11 does not "hesitate" when the auxiliary resistance is switched in, but in which no zero load voltage can occur.

The parts 1—20 correspond to those shown in Fig. 4. The magnet 11 here is provided with a fixed core 10 and with an armature 21 secured to the one arm of a lever 22, which is fulcrumed as at 23 and the other arm of which is loaded by a spring 24. The left hand side end of this lever is connected through a rod 25 to a bridging member 26 adapted to bridge the contacts 27 and 28, the latter being permanently connected to the contacts 7 and 8 through the leads 29 and 30, respectively.

The installation is illustrated in welding position. If the length of the welding arc exceeds a predetermined limit, the magnet 10, 11 overcomes the action of the spring 24, so that the armature 21 is attracted by the magnet with a rapidly increasing force and the contacts 27 and 28 are bridged by member 26. As a result, auxiliary resistance 6 is switched in, which again causes the arc to break. Thereafter coil 16 dies, the connection between contacts 17 and 18 is broken and that between contacts 7 and 8 established.

What I claim is:—

1. In an electric arc-welding apparatus, a welding circuit, a shunt circuit across the welding circuit including a resistance, electromagnetic means for opening and closing the shunt circuit, the energization of the electromagnetic means being dependent upon the voltage across the welding arc and also, but reversely, dependent of the strength of the welding current whereby the energization by the voltage prevails over that by the strength of the current, if the voltage rises to a predetermined value prior to the welding arc breaking.

2. In an electric arc-welding apparatus, a welding circuit, a shunt circuit across the welding circuit including a resistance, electromagnetic means for opening and closing the shunt circuit, the energization of the electromagnetic means being dependent upon the voltage across the welding arc, said electromagnetic means including an electric element energized by the voltage and acting to open the shunt circuit, and a second electric element acting in the same sense as the first electric element and energized by the welding current in response to energization of said first electric element.

3. In an electric arc-welding apparatus, a welding circuit, a shunt circuit across the welding circuit including a resistance, electromagnetic means for opening and closing the shunt circuit, at two points in parallel relation to each other, at one point under the influence of the welding current and at the other point under the influence of the voltage, said electromagnetic means including an electric element energized by the voltage and acting to open the shunt circuit, and a second electric element acting in the same sense as the first electric element and energized by the welding current in response to energization of said first electric element.

In testimony whereof I affix my signature.

JAN HENDRIK EZENDAM.